Patented Sept. 18, 1923.

1,468,331

UNITED STATES PATENT OFFICE.

CHARLES EMILE SOANE, OF LONDON, ENGLAND, ASSIGNOR OF ONE-HALF TO USHER-WALKER LIMITED, OF LONDON, ENGLAND, A BRITISH LIMITED LIABILITY COMPANY.

PRODUCTION OF PLASTIC COMPOSITIONS.

No Drawing.   Application filed May 5, 1921.   Serial No. 466,994.

*To all whom it may concern:*

Be it known that I, CHARLES EMILE SOANE, a subject of the King of England, residing in London, England, have invented certain new and useful Improvements in the Production of Plastic Compositions, of which the following is a specification.

This invention is for improvements in and relating to the production of plastic compositions, and concerns that type of composition which is prepared from gelatine, such, for example, as is described in our specifications of British Letters Patent, Nos. 12,677 of 1914, and 2,167 of 1915.

It is known to render gelatinous compositions, such as mixtures of soaked glue and glycerine, insoluble by treatment with formaldehyde, or compounds capable of evolving formaldehyde, such as trioxymethylene, and acetaldehyde and acrolein have been proposed for a similar purpose.

In our specification No. 12,677 of 1914, we have described a process for the production of an infusible resilient composition, according to which process a mixture containing glycerine and soaked glue is rendered infusible by treatment with hexamethylenetetramine. The substance so produced was found to be free from the disadvantages associated with gelatinous compositions prepared by the aid of formaldehyde or trioxymethylene.

In our specification No. 2,167 of 1915, a similar process for the manufacture of an infusible resilient composition is described, a gelatinous water containing mass, such as a mixture of glycerine and glue soaked in water, being treated with a cyclic aldehyde, such for example, as furfural, or with aldehyde-containing products, like caramel, obtained by the pyrogenetic decomposition of sugars such as sucrose. By the use of these reagents the desired degree of infusibility was imparted to the composition while at the same time the period of settling was sufficiently gradual as to permit the desired moulding operations to be conveniently carried out.

We have now found that furfural and these pyrogenetic decomposition products of sugars such as sucrose may be very advantageously replaced by certain sugars themselves, and that these latter afford convenient alternative reagents for rendering gelatin compositions infusible.

According to the present invention, therefore, a process for the manufacture of an infusible material by the action of an aldehyde upon a gelatin composition is characterized by treating the latter with a pentose.

The invention is particularly applicable to the production of infusible resilient compositions from mixtures containing glycerine and gelatin, for instance, glue, soaked in water, such as are described in our prior British specifications, Nos. 12,677/14 and 2,167/15. Under the action of heat, the pentose undergoes decomposition with production within the reaction mass of furfural which acts upon the gelatin, rendering the latter insoluble. As pentoses, such for example, as arabinose and xylose, are soluble in water as well as in glycerine, they are readily incorporated evenly with the solid and liquid initial components of the composition, and as a result, their action upon the latter is uniform and regular.

A mixture of pentoses may be used, and we have found that it is generally unnecessary to employ the sugar itself, and that the syrup obtained from the products of hydrolysis of a pentosan may be directly utilized. A pentosan itself may on occasion be employed when the reaction conditions are such as to give rise to a pentose or decomposition products of the latter, and the word "pentose" as used in this specification and claims includes substances which contain or are capable of yielding the pentose, as well as the sugar itself.

Arabinose and xylose are examples of pentoses utilizable according to this invention.

The pentose or its equivalent may be added at any convenient stage of the process, and reagents to promote the action of the pentose may be employed as required, and the temperature and pressure may be varied as occasion demands.

Any known method may be employed for preparing the pentose. For example, the latter may be simply and conveniently obtained by hydrolysis of the corresponding pentosan with dilute sulphuric or oxalic acid, followed by neutralization of the mixture with lime, filtration and evaporation of the acid-free filtrate under reduced pressure. It is preferable to employ the acids mentioned since they give insoluble calcium salts which are readily removed from the sugar solution by filtration.

The invention may be conveniently exemplified in its application to the manufacture of infusible resilient compositions from mixtures containing glycerine and gelatine such as are described in our prior specifications, Nos. 12,677/14 and 2,167/15. The following examples, which are given as illustrative of this application of the invention and not by way of limitation, will serve to indicate suitable components for compositions of this type.

I.

| | Per cent. |
|---|---|
| Wood-pulp | 5.7 |
| Glycerine | 37.7 |
| Soaked glue | 56.6 |
| Arabinose syrup (75–80%) | 2.5 |

II.

| | |
|---|---|
| Light magnesia | 37.0 |
| Wood-pulp | 1.0 |
| Glycerine | 37.0 |
| Soaked glue | 25.0 |
| Arabinose syrup (75–80%) | 2.5 |

III.

| | |
|---|---|
| Magnesium carbonate | 37.5 |
| Glycerine | 37.5 |
| Soaked glue | 25.0 |
| Arabinose syrup (75–80%) | 2.5 |

IV.

| | |
|---|---|
| Precipitated chalk | 44.5 |
| Glycerine | 28.9 |
| Soaked glue | 26.6 |
| Arabinose syrup (75–80%) | 2.5 |

Dry glue is soaked in cold water until it has taken up half its weight of the latter, and the soaked glue is then liquefied by heating. The mineral matter is ground with the glycerine and the mixture is added to and thoroughly incorporated with the glue solution. When, as in Example II above, both wood-pulp and mineral matter are employed, it is preferred to utilize a part of the glycerine for grinding with the mineral matter, while the remainder of the glycerine is independently worked up into a homogenous paste with the fibrous pulp, and this mass is intimately admixed with the solution of glue. The whole mixture is then heated for an hour or more in a steam- or hot-water-jacketed pan until the desired consistency has been attained. Then the arabinose syrup is added, and is thoroughly incorporated with the glycerine-glue mixture.

The composition is then run or forced into the moulds and is heated therein for a period of from twenty minutes to 2½ hours until infusibility or the desired degree of induration has been attained. The period of heating necessary depends upon the nature of the ingredients. For example, if the light magnesia in Example II be replaced by calcium sulphate, the heating period is more prolonged.

It will be appreciated that the proportion of pentose used is dependent upon circumstances as, for example, the particular nature of the composition under treatment, or the form in which the pentose may be employed, but a simple preliminary experiment will suffice to determine the most advantageous conditions of operation in any given case.

Various mineral fillers may be employed to impart firmness to the composition, such for example, as alumina, zinc oxide, or calcium sulphate (preferably the precipitated salt), as well as the substances given in the above examples, or two or more mineral fillers may be used together. Similarly, instead of wood-plup, other fibrous materials, for example, cork dust, or mixtures of various fibrous substances, may be utilized.

The compositions prepared as described are adaptable for a number of purposes, for instance, for making printers' rollers, and printers' stamps, surgical pads, etc. Thus, the material made according to Example I above is utilizable as a composition for motor- and other resilient-tyre parts.

The action of the reagents used according to the present invention is much more gradual than is the action of formaldehyde or its equivalent, and it may be mentioned that the induration of the gelatin takes place over quite an appreciable period of time, which is clearly of great advantage in permitting of the desired moulding operations to be easily carried out before complete hardness is effected.

What I claim as my invention and desire to secure by Letters Patent is:—

1. The herein described process for the manufacture of a plastic composition, which comprises treating a composition containing a gelatine with the hydrolytic products of a pentosan.

2. The herein described process for the manufacture of a plastic composition, which comprises treating a composition containing gelatine with a pentose.

3. The herein described process for the manufacture of a plastic composition, which comprises treating a water-containing composition including gelatine with a pentose.

4. In the manufacture of a plastic material, the step consisting in heating gelatine with a pentose.

5. In the manufacture of a plastic material, the step consisting in heating water-containing gelatine with a pentose.

6. In the manufacture of a plastic material, the step consisting in heating gelatine and a filling material with a pentose.

7. The process for the manufacture of a plastic material, which comprises heating gelatine and glycerine with a pentose.

8. The process for the manufacture of a plastic material, which comprises heating water-containing gelatine nad glycerine with a pentose.

9. The process for the manufacture of a plastic material, which comprises heating water-soaked glue and glycerine with a pentose.

10. The process for the manufacture of a plastic material, which comprises heating water-soaked glue and glycerine with arabinose.

11. In the manufacture of a plastic material, the step consisting in heating water-soaked glue, glycerine and a filling material with a pentose.

12. In the manufacture of a plastic material, the steps consisting in grinding a filler, with glycerine, compounding the mixture with water-soaked glue, and heating the product with a pentose.

13. In the manufacture of a plastic material, the steps consisting in soaking dry glue in water, liquefying the mass, compounding it with glycerine and a filler, and heating the mixture with a pentose.

14. In the manufacture of a plastic material, the steps consisting in soaking dry glue in water, liquefying the mass, compounding it with glycerine and a fibrous filling material, and heating the mixture with a pentose.

15. In the manufacture of a plastic material, the steps consisting in soaking dry glue in water until it has taken up half its weight of the latter, liquefying the mass, compounding it with glycerine and a filling material, and heating the mixture with a pentose.

In testimony whereof I affix my signature.

CHARLES EMILE SOANE.